2 Sheets—Sheet 1.

E. FOX.
Steam-Cooking Apparatus.

No. 224,672. Patented Feb. 17, 1880.

Witnesses
Chas H Smith
Geo. T. Pinckney

Inventor
Edward Fox
per Lemuel W. Serrell
Atty

2 Sheets—Sheet 2.

E. FOX.
Steam-Cooking Apparatus.

No. 224,672.      Patented Feb. 17, 1880.

Witnesses
Chas. H. Smith
G. T. Pinckney

Inventor
Edward Fox.
per Lemuel W. Serrell
att

UNITED STATES PATENT OFFICE.

EDWARD FOX, OF BROOKLYN, NEW YORK, ASSIGNOR TO KIERAN EGAN, OF SAME PLACE.

STEAM COOKING APPARATUS.

SPECIFICATION forming part of Letters Patent No. 224,672, dated February 17, 1880.

Application filed May 28, 1879.

*To all whom it may concern:*

Be it known that I, EDWARD FOX, of Brooklyn, in the State of New York, have invented an Improvement in Steam Cooking Apparatus, of which the following is a specification.

Ranges and other devices for cooking have been heated by steam contained in a jacket or surrounding case, and in other cooking devices the heat has been obtained by gas or vapor burners.

I make use of steam for heating the cooking-vessels, and I regulate the temperature of the steam and the heat from the same by the action of a gas or vapor burner upon the steam-pipe to superheat the steam.

Figure 1:
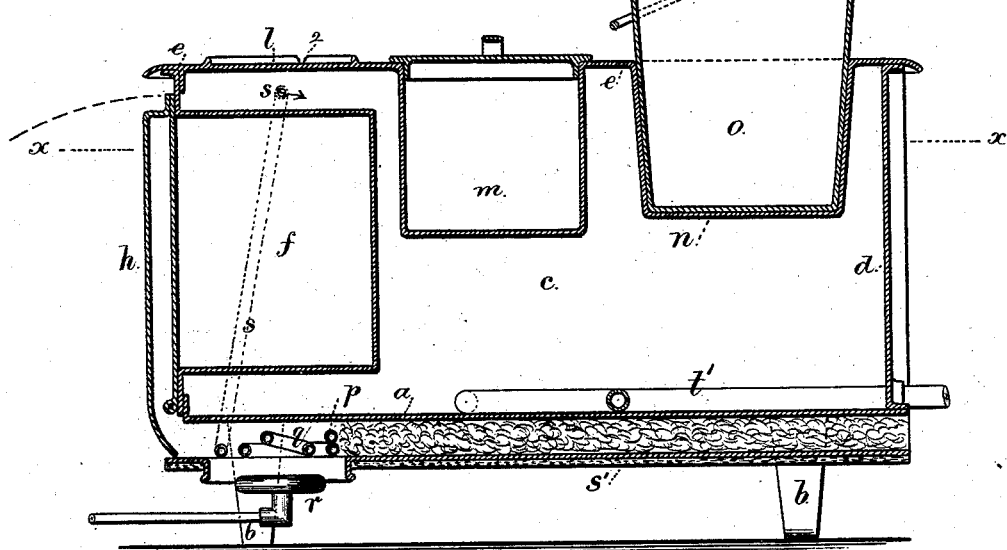
Figure 2:
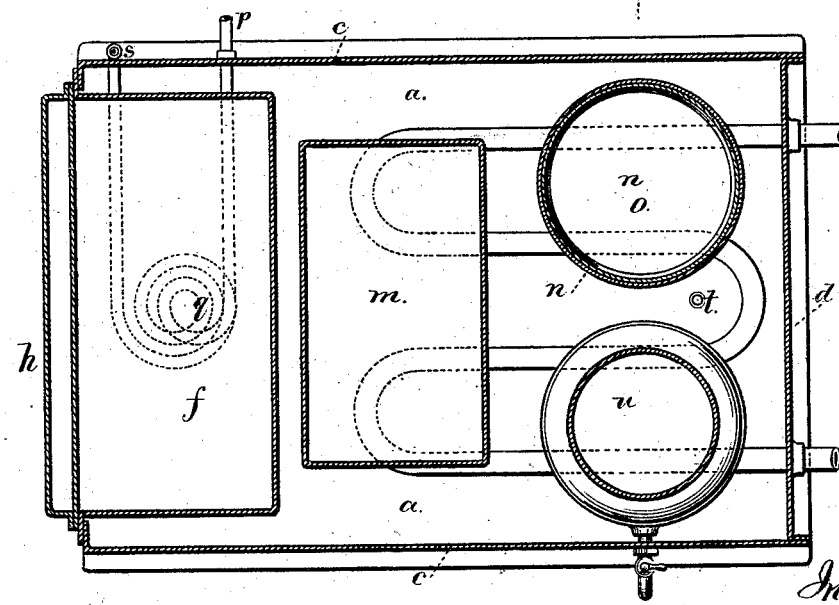
Figure 3:
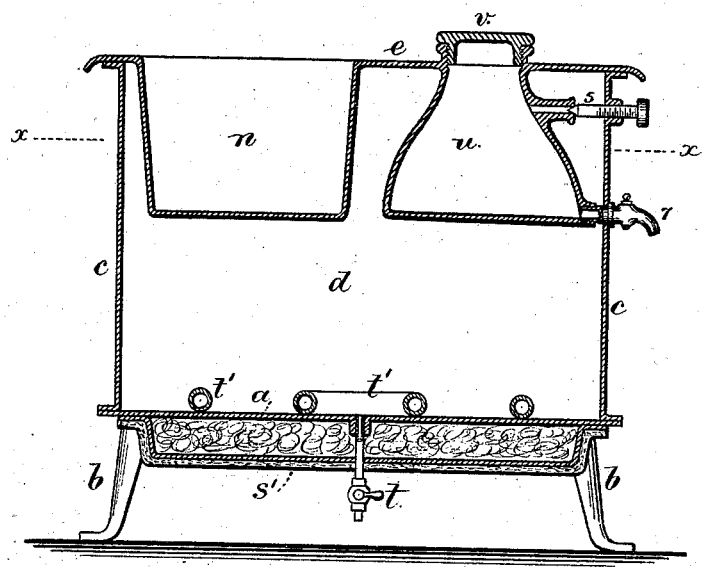

In the drawings, Figure 1 is a vertical section of the range longitudinally. Fig. 2 is a plan of said range at the line $x\ x$, and Fig. 3 is a cross-section of the range at the line $y\ y$.

The various plates of the stove or range forming the case thereof are to be made of either cast or wrought metal, and they are to be bolted together, or secured in any convenient manner so as to be steam-tight.

The bottom plate, $a$, is supported upon legs $b\ b$, and to this the side plates, $c\ c$, and back plate, $d$, are connected, and the top plate, $e$, is upon the side plates and end plates and bolted thereto.

The oven $f$ is made of top, bottom, side, and back plates, and it is secured to a rim or frame so that the edges are made steam-tight, and there is a door, $h$, to the oven, the same being made as hereinafter specified.

The cooking spaces or vessels are of any desired character. I have shown the broiling-plate $l$ in the top of the range, with a gravy-gutter around it leading to the spout 2, from which the gravy is drawn, and the material to be fried or broiled is preferably laid upon a plate or grating so as not to come into direct contact, and there should be a cover to retain the heat.

At $m$ is a vessel for boiling or baking, the viands being placed into the same from the top and covered down. Usually the substance to be cooked will be placed in a pan and then introduced into this vessel $m$. A similar vessel, $n$, is also represented, the same being slightly conical, so that the removable vessel $o$, made in the shape of a pail, can be introduced or withdrawn. When in place the surfaces of the vessel $o$ should touch the interior of the stationary vessel $n$.

I will now describe the features of novelty to which my invention particularly relates.

Heretofore it has been usual to introduce steam between the case and the various cooking-vessels; but in order to obtain the required heat the steam had to be under considerable pressure. This rendered it dangerous, and also necessitated heavy and strong cooking-stoves or ranges.

I superheat the steam previous to its passage into the stove. For this purpose the steam-supply pipe $p$ is connected with the coil $q$, that is above a burner, $r$, for gas, vapor, or other suitable combustible material, and this superheats the steam in its passage to the pipe $s$, that conveys the said steam to the space below the broiler and above the oven, so as to act the most powerfully when the materials acted upon require the highest temperature. The steam then fills the entire steam-spaces of the stove, and the water of condensation or the cooled steam is allowed to escape from the pipe $t$.

In order to utilize the heat of the burner $r$, I apply the same and the steam-coil beneath the bottom plate of the stove or range, and I make a false bottom, $s'$, of non-conducting material, such as asbestus and plaster, and I leave a chamber between the same and the bottom of the oven, into which scraps of sheet metal or similar substances are introduced, that will absorb heat and prevent the loss of the same with the escaping products of combustion.

The oven-door is made of two thicknesses, so as to be hollow, and there is a space at the bottom edge that is adjacent to the space between the false bottom $s'$ and the bottom $a$, so that the heated products of combustion will ascend into the oven-door and heat the same, and thereby promote the cooking operation within the oven.

The pipe $t'$ takes the place of the ordinary water-back in a range, the same being connected at its ends with the hot-water vessel at two places, one above the other, so that the water circulates through this pipe and heats the contents of the hot-water vessel.

I make use of a steam-digester for bringing the heated steam, under pressure, into direct contact with the food to be cooked, so as to effect the thorough cooking operation very rapidly.

The vessel $u$ is preferably of a larger size at the bottom than at the top. It is provided with a cover, $v$, that is removable, and can be closed steam-tight. I have shown the same as screwed upon the neck of the digester. A valve, 5, admits steam from the steam-space of the range directly into this digester for the purposes aforesaid. The cock and pipe 7 allow the liquid portions of the digester to be withdrawn.

I am aware that in broiling and frying appliances there has been a gutter around the portion upon which the meat is placed, into which gutter the gravy passes.

I am also aware that a cover has been used with a gridiron and with a frying-pan. I therefore do not claim any such device in itself or in a steam cooking apparatus.

I claim as my invention—

1. The combination, in a cooking apparatus, of vessels for containing the food to be cooked, and surrounding steam jacket or case with steam-space, of a steam-supply pipe and a burner or heater to superheat the steam, substantially as set forth.

2. The combination, with a steam cooking apparatus, of a steam-coil below the bottom of the range, a burner to superheat the steam, and a false bottom to retain and utilize the products of combustion, substantially as set forth.

3. The combination, in a steam cooking apparatus, of a steam-supply pipe, a superheating-burner, a false bottom, an oven, and an oven-door formed hollow, and into which the products of combustion pass, substantially as set forth.

4. In a steam cooking apparatus, the combination, with the case, of a digester provided with a removable cover that can be closed steam-tight and a valve that admits steam directly into the digester, substantially as set forth.

5. In a steam cooking apparatus, the combination, with the steam-supply pipe and the superheating-burner, of the false bottom $s'$ and the pieces of sheet or other metal within the space for the products of combustion, substantially as set forth.

Signed by me this 22d day of May, A. D. 1879.

EDWARD FOX.

Witnesses:
  WILLIAM G. MOTT,
  GEO. T. PINCKNEY.